(12) United States Patent
Vestin et al.

(10) Patent No.: US 6,302,683 B1
(45) Date of Patent: Oct. 16, 2001

(54) CATALYTIC COMBUSTION CHAMBER AND METHOD FOR IGNITING AND CONTROLLING THE CATALYTIC COMBUSTION CHAMBER

(75) Inventors: Anders Vestin, Lund; Staffan Lundgren, Hindås; Edward Jobson, Romelanda, all of (SE)

(73) Assignee: AB Volvo (SE)

( * ) Notice: Subject to any disclaimer, the term of this patent is extended or adjusted under 35 U.S.C. 154(b) by 0 days.

(21) Appl. No.: 09/215,971

(22) Filed: Dec. 18, 1998

Related U.S. Application Data

(63) Continuation of application No. PCT/SE97/01184, filed on Jul. 1, 1997.

(30) Foreign Application Priority Data

Jul. 8, 1996 (SE) .................................. 9602688-5

(51) Int. Cl.[7] .............................. F23D 3/40; F23Q 11/00
(52) U.S. Cl. .............................. 431/7; 431/268; 431/170; 60/723
(58) Field of Search .................... 431/7, 328, 329, 431/6, 326, 170, 268; 60/723, 274; 136/204, 205; 422/171

(56) References Cited

U.S. PATENT DOCUMENTS

| | | | |
|---|---|---|---|
| 2,677,359 | * 5/1954 | Fielder | 126/57 |
| 3,024,836 | * 3/1962 | Bello | 431/326 |
| 3,029,802 | * 4/1962 | Webster | 126/57 |
| 3,146,821 | * 9/1964 | Wuetig | 431/9 |
| 3,150,656 | * 9/1964 | Huber | 136/204 |
| 3,291,187 | * 12/1966 | Haensel | 431/329 |
| 3,501,257 | * 3/1970 | Hilton et al. | 126/57 |
| 3,803,839 | * 4/1974 | Santiago | 60/274 |
| 3,868,211 | * 2/1975 | Hay et al. | 431/115 |

(List continued on next page.)

FOREIGN PATENT DOCUMENTS

| | | |
|---|---|---|
| 431 669 | 2/1984 | (CH) . |
| 61-186704 | 8/1986 | (JP) . |

OTHER PUBLICATIONS

Patent Abstracts of Japan, vol. 11, No. 10, M–552, abstract of JP,A,61–186704 (Babcock Hitachi K.K.), Aug. 20, 1986.
Patent Abstracts of Japan, vol. 16 No. 302, M–1275, abstract of JP,A,4–84009 (Matsushita Electric Ind. Co. Ltd.), Mar. 17, 1992.
Patent Abstracts of Japan, vol. 18, No. 183, M–1584, Abstract of JP,A,5–340515 (Matsushita Electric Inc. Co. Ltd.), Dec. 21, 1993.
Patent Abstracts of Japan, vol. 13, No. 591, M–913, abstract of JP,A,1–247902 (Babcock Hitachi K.K.), Oct. 3, 1989.

*Primary Examiner*—Ira S. Lazarus
*Assistant Examiner*—Josiah C. Cocks
(74) *Attorney, Agent, or Firm*—Lerner, David, Littenberg, Krumholz & Mentlik, LLP

(57) ABSTRACT

Methods for operating catalytic combustion chambers including first and second catalytic reactors disposed in series with an intermediate chamber therebetween are disclosed, the method including heating the first catalytic reactor to a temperature at least equal to the ignition temperature of the first catalytic reactor, introducing air and fuel mixture to the first catalytic reactor whereby catalytic combustion is initiated in the first catalytic reactor, and increasing the mass flow through the first catalytic reactor whereby combustion of the air and fuel mixture takes place in the gas phase in the intermediate chamber and the end surface of the second catalytic reactor is heated to a temperature at least equal to the ignition temperature of the second catalytic reactor and ignition takes place in the second catalytic reactor.

6 Claims, 2 Drawing Sheets

U.S. PATENT DOCUMENTS

| | | | |
|---|---|---|---|
| 3,914,090 | | 10/1975 | Pfefferle . |
| 3,922,136 | * | 11/1975 | Koch ................................ 431/328 |
| 3,928,961 | * | 12/1975 | Pfefferle ............................... 431/7 |
| 4,019,316 | * | 4/1977 | Pfefferle ............................... 431/7 |
| 4,040,252 | * | 8/1977 | Mosier et al. ...................... 60/723 |
| 4,065,917 | * | 1/1978 | Pfefferle ............................... 431/6 |
| 4,080,150 | * | 3/1978 | Hunter et al. ....................... 431/6 |
| 4,118,199 | * | 10/1978 | Volker et al. ..................... 422/171 |
| 4,179,222 | * | 12/1979 | Strom et al. ...................... 366/337 |
| 4,204,829 | * | 5/1980 | Kendall et al. ....................... 431/7 |
| 4,285,666 | * | 8/1981 | Burton et al. .................... 431/329 |
| 4,459,126 | * | 7/1984 | Kroll et al. ............................ 431/7 |
| 4,556,543 | * | 12/1985 | Mochida et al. ................. 422/171 |
| 4,597,734 | * | 7/1986 | McCausland et al. ........... 431/326 |
| 4,828,170 | * | 5/1989 | Takman ......................... 126/110 C |
| 4,942,832 | * | 7/1990 | Finke ................................ 431/115 |
| 4,995,807 | * | 2/1991 | Rampley et al. ..................... 431/9 |
| 5,044,935 | * | 9/1991 | Peter ................................... 431/9 |
| 5,106,588 | * | 4/1992 | Sims et al. ....................... 422/180 |
| 5,125,231 | * | 6/1992 | Patil et al. ........................ 422/171 |
| 5,150,573 | * | 9/1992 | Maus et al. ...................... 422/171 |
| 5,332,554 | * | 7/1994 | Yasaki et al. .................... 422/177 |
| 5,347,958 | * | 9/1994 | Gordon, Jr. ...................... 431/115 |
| 5,395,235 | * | 3/1995 | Hung ............................... 431/328 |
| 5,403,559 | * | 4/1995 | Swars .............................. 422/171 |
| 5,505,910 | * | 4/1996 | Nishida et al. ................... 422/171 |
| 5,511,971 | * | 4/1996 | Benz et al. ........................... 431/9 |
| 5,570,576 | * | 11/1996 | Ament et al. ...................... 60/274 |
| 5,707,008 | * | 1/1998 | Eppler et al. ....................... 126/57 |
| 5,793,119 | * | 8/1998 | Zihke ............................... 136/205 |
| 5,797,737 | * | 8/1998 | Le Gal et al. ......................... 431/7 |

* cited by examiner

CATALYTIC COMBUSTION CHAMBER AND METHOD FOR IGNITING AND CONTROLLING THE CATALYTIC COMBUSTION CHAMBER

CROSS-REFERENCE TO RELATED APPLICATIONS

This is a continuation of International Application No. PCT/SE97/01184 filed on Jul. 1, 1997.

FIELD OF THE INVENTION

The present invention relates to a method for igniting And controlling a catalytic combustion chamber, wherein the combustion chamber comprises a first catalytic reactor and at least a second catalytic reactor arranged in series with the first catalytic reactor. More particularly, the present invention relates to such a combustion chamber wherein the first catalytic reactor is heated to a temperature which exceeds or is equal to the ignition temperature of the catalytic reactor, whereafter a mixture of fuel and air is introduced to the catalytic reactor, whereby catalytic combustion is started in the first catalytic reactor.

Still more particularly, the present invention relates to a method for igniting a catalytic reactor and a catalytic combustion chamber comprising at least two serially arranged catalytic reactors.

BACKGROUND OF THE INVENTION

In order to achieve efficient combustion in a combustion chamber even at low temperatures, and to avoid the emission of high amounts of nitric oxides, it has been suggested that the combustion be performed in the presence of a catalyst. By using a catalyst it is thus possible to achieve almost complete combustion of fuel/air-mixtures in which the percentage of fuel is very low. In this way, operation of the catalytic combustion chamber can be very safe, since the gas mixture which is used is not inflammable at atmospheric pressure in the absence of a catalyst. Accordingly, there is no risk of explosion if the air/fuel mixture should leak out of the catalytic combustion chamber. In addition, a catalytic combustion chamber is reliable, and does not generate irritating noise when in operation.

In Japanese Patent Application No. 2-197245 a catalytic combustion chamber is described comprising two catalytic reactors, wherein a main catalytic reactor is heated by the exhaust gases from a preheating catalytic reactor. The preheating catalytic reactor is heated to its ignition temperature by means of an electrically heated heater. A portion of the heat generated by combustion in the preheating catalytic reactor is utilized for heating a carburetor in order to vaporize the fuel. An ignition process of this type is comparatively slow, and requires a large initial consumption of electricity. It also results in high emissions of carbohydrates and carbon monoxide.

A further catalytic combustion chamber comprising two serially coupled catalytic reactors is described in Japanese Patent Application No. 60-27994. This publication also utilizes a two-step process for initiating catalytic combustion. Instead of heating the first catalytic reactor when igniting the catalytic combustion chamber, the gas which is conducted through the catalytic reactor is heated, thereby accomplishing ignition. An ignition process of this type demands a high initial energy supply and, consequently, involves a large energy consumption during the ignition process.

These previously known two-step ignition processes do not significantly diminish either the emissions of incompletely combusted fuel or the consumption of electricity during the ignition process. For this reason, there remains considerable demand for a simple, quick and electricity saving ignition process for a catalytic combustion chamber having low emission of carbohydrates and carbon monoxide.

SUMMARY OF THE INVENTION

In accordance with the present invention, these and other objects have now been realized by the discovery of a method of operating a catalytic combustion chamber including a first catalytic reactor, a second catalytic reactor including an end surface facing the first catalytic reactor, the second catalytic reactor disposed in series with the first catalytic reactor, and an intermediate chamber between the first and second catalytic reactors, the method comprising heating the first catalytic reactor to a temperature at least equal to the ignition temperature of the first catalytic reactor, introducing an air and fuel mixture to the first catalytic reactor, whereby catalytic combustion is initiated in the first catalytic reactor, and increasing the mass flow through the first catalytic reactor whereby combustion of the air and fuel mixture takes place in the gas phase in the intermediate chamber and the end surface is heated to a temperature at least equal to the ignition temperature of the second catalytic reactor and ignition takes place in the second catalytic reactor. In accordance with a preferred embodiment, the method includes adjusting the mass flow through the second catalytic reactor after the ignition in the second catalytic reactor whereby substantially all of the combustion takes place in the second catalytic reactor. In a preferred embodiment, the method also includes adjusting the mass flow through the second catalytic reactor after substantially all of the end surface of the second catalytic reactor is heated to a temperature at least equal to the ignition temperature of the second catalytic reactor.

In accordance with another embodiment of the method of the present invention, the method includes preheating the first catalytic reactor to the ignition temperature of the first catalytic reactor prior to introducing of the air and fuel mixture to the first catalytic reactor, the air and fuel mixture having a $\lambda$ value of greater than about 1, whereby the combustion is initiated in the first catalytic reactor and the temperature of the first catalytic reactor is raised above the ignition temperature of the first catalytic reactor, increasing the mass flow of the air through the first catalytic reactor at a temperature corresponding to from between about 60% and 100% conversion in the first catalytic reactor and the $\lambda$ value is increased, and further increasing the mass flow of the air through the first catalytic reactor at a substantially constant $\lambda$ value whereby at least part of the combustion takes place in the gas phase in the intermediate chamber.

In accordance with another embodiment of the method of the present invention, the method includes electrically preheating the first catalytic reactor.

In accordance with another embodiment of the method of the present invention, substantially all of the combustion upstream of the second catalytic reactor takes place in the gas phase in the intermediate chamber during the ignition in the second catalytic reactor.

In accordance with the present invention, a catalytic combustion chamber has been invented comprising a first catalytic reactor having a first volume and a second catalytic reactor having a second volume disposed in series with the first catalytic reactor, the ratio of the first volume to the second volume being from about $4.5\times10^{-3}$ to 0.18. Preferably, the ratio of the first volume to the second volume is from about 0.16 to 0.05.

In accordance with one embodiment of the catalytic combustion chamber of the present invention, the chamber comprises a first catalytic reactor and a second catalytic reactor disposed in series with the first catalytic reactor, at least one of the first and second catalytic reactors comprising a net.

In accordance with one embodiment of the catalytic combustion chamber of the present invention, the chamber includes a static mixer mounted upstream of the first catalytic reactor.

In accordance with another embodiment of the catalytic combustion chamber of the present invention, the chamber includes a first flow equalizing net mounted upstream of the first catalytic reactor. In accordance with another embodiment, the chamber includes a second flow equalizing net mounted between the first catalytic reactor and the second catalytic reactor.

In accordance with another embodiment of the catalytic combustion chamber of the present invention, the chamber includes an air blower for supplying air to the catalytic combustion chamber, and a conduit for returning at least part of the exhaust gases from the catalytic combustion chamber to the air blower from a location downstream of the second catalytic reactor.

In accordance with another embodiment of the catalytic combustion chamber of the present invention, the chamber includes a Peltier element in connection with the second catalytic reactor for retrieving electrical energy therefrom.

In accordance with another embodiment of the catalytic combustion chamber of the present invention, the chamber is used in heating a vehicle. Preferably, the vehicle comprises a motor vehicle including an engine, and the chamber includes a conduit from the catalytic combustion chamber to the engine.

In accordance with the present invention, a method for controlling a catalytic reactor has been invented including preheating the catalytic reactor to a temperature of at least the ignition temperature for the catalytic reactor, feeding a fuel and air mixture having a first $\lambda$ value greater than about 1 to the catalytic reactor whereby catalytic combustion is initiated in the catalytic reactor and the temperature in the catalytic reactor is raised to a temperature above the ignition temperature, and increasing the mass flow through the catalytic reactor at a temperature corresponding to from about 60% to 100% conversion therein, whereby the first $\lambda$ value is increased to a second $\lambda$ value. Preferably, the first $\lambda$ value is between about 1 and 2 and the second $\lambda$ value is between about 2 and 4.

In accordance with the present invention, a method for controlling a catalytic combustion chamber including a catalytic reactor has been invented, the method comprising controlling the temperature and the efficiency of the catalytic reactor by changing the $\lambda$ value for a predetermined air and fuel mixture introduced into the catalytic combustion chamber in a manner such that lowering of the $\lambda$ value increases the temperature and raising the $\lambda$ value lowers the temperature.

Preferably, the catalytic combustion chamber comprises a first catalytic reactor and a second catalytic reactor disposed in series with the first catalytic reactor.

The present invention provides an ignition process which is primarily distinguished by the fact that the mass flow through the catalytic combustion chamber is increased after ignition of the first catalytic reactor, whereafter combustion of the fuel mixture partly takes place in a gas phase in an intermediate chamber between the first catalytic reactor and the second catalytic reactor.

In accordance with a preferred embodiment of the present invention, the gas phase combustion generates a flame which heats the end surface of the second catalytic reactor which is closest to and faces the first catalytic reactor to a temperature which exceeds or is equal to the ignition temperature of the second catalytic reactor, which is the temperature at which a 50% conversion rate is obtained in the second catalytic reactor, whereafter the mass flow through the catalytic reactor is adjusted so that substantially all combustion takes place in the second catalytic reactor and combustion in the first catalytic reactor and in the gas phase substantially ceases.

It is suitable if the end surface of the second catalytic reactor which is closest to the first catalytic reactor is heated to a temperature which exceeds or is equal to the ignition temperature before the mass flow through the catalytic reactor is changed.

In accordance with the present invention, it is advantageous if the first catalytic reactor is ignited after it is heated to its ignition temperature by being charged with a fuel/air mixture having a $\lambda$-value exceeding 1, whereby catalytic combustion is initiated in the catalytic reactor and the temperature in the catalytic reactor is caused to rise further above the ignition temperature, whereafter the $\lambda$-value is raised by increasing the air mass flow through the catalytic reactor at a catalytic reactor temperature corresponding to from 60% to almost 100% conversion in the catalytic reactor.

The gas phase combustion in the intermediate chamber may be achieved by increasing the mass flow through the first catalytic reactor at a constant $\lambda$-value, after ignition of the first catalytic reactor. When flame combustion takes place in the intermediate chamber, the major part of the combustion preferably takes place in the gas phase downstream of the first catalytic reactor. This is accomplished by controlling the $\lambda$-value. In this manner, lean catalytically stabilized gas phase combustion is obtained, resulting in low nitrogen oxide emission, which would not be possible without the presence of the catalyst.

Very lean air/fuel-mixtures (high $\lambda$-values) produce combustion without a flame, while too rich an air/fuel mixture (low $\lambda$-values) produces a conventional flame combustion resulting in high emissions of nitrogen oxides. Accordingly, it is important to adjust the $\lambda$-value so that the desired combination of catalytical combustion and gas phase combustion is obtained.

The preheating of the first catalytic reactor is preferably performed electrically, though conventional heating with a flame is possible.

A catalytic combustion chamber in accordance with the present invention, comprising a first catalytic reactor and at least a second catalytic reactor serially arranged with the first catalytic reactor is distinguished by the ratio between the volume of the first catalytic reactor and the volume of the second catalytic reactor being from about $4.5\times10^{-3}$ to 0.18 and preferably from about 0.016 to 0.05.

In accordance with one embodiment of the present invention, a static mixer is located upstream of the first catalytic reactor.

In accordance with another embodiment of the present invention, a first flow-equalizing and mixing net is located upstream of the first catalytic reactor. If the catalytic combustion chamber comprises both a static mixer and a flow-equalizing net, the flow-equalizing net is preferably arranged between the mixer and the first catalytic reactor.

In accordance with still another embodiment of the present invention, a second flow-equalizing net is located between the first catalytic reactor and the second catalytic reactor.

In order to evaporate the fuel and increase the efficiency of a heat exchanger which is connected to a catalytic combustion chamber, a conduit for returning a portion of the exhaust gas from the catalytic combustion chamber to an air-blower for supplying the combustion chamber with air may be arranged downstream of the second catalytic reactor, between the combustion chamber and the inlet to the air blower.

Another way of vaporizing the fuel and increasing the efficiency of a catalytic combustion chamber is by conducting the air to the air blower through a heat exchanger which is arranged downstream of the second catalytic reactor.

The catalytic combustion chamber in accordance with the present invention may further be provided with a Peltier element arranged in connection with the second catalytic reactor for retrieving electrical energy.

The present invention further includes a method for controlling the ignition process of a catalytic reactor. The method is distinguished by a mixture of fuel and air having an initial $\lambda$-value exceeding 1 being introduced to the preheated catalytic reactor whereby catalytic combustion is started in the catalytic reactor and whereby the temperature in the catalytic reactor is caused to rise above the ignition temperature, whereafter the $\lambda$-value is increased to a second $\lambda$-value exceeding the initial $\lambda$-value by. increasing the mass flow through the catalytic reactor at a temperature in the catalytic reactor corresponding to between about 60% and almost 100% conversion in the catalytic reactor. The initial $\lambda$-value is preferably between 1 and 2 and the second $\lambda$-value is preferably between 2 and 4.

By adjusting the gas flow and the relative air/fuel ratio (the $\lambda$-value) through the first catalytic reactor so that a part of the combustion takes place in a gas phase downstream of the first catalytic reactor, it is possible to obtain rapid and efficient heating, resulting in a faster ignition of the second catalytic reactor. In this manner the ignition time, as well as the energy consumption during the ignition process, may be reduced to a minimum.

The power which is produced in the flame between the two catalytic reactors is considerably higher than the power which may be produced in the first catalytic reactor at 100% catalytic combustion. This implies that, due to the flame between the catalytic reactors, it is possible to increase the power of the first catalytic reactor approximately 3 times as compared to combustion taking place completely in the first catalytic reactor and not at all in a gas phase. It is therefore possible to reduce the size of the first catalytic reactor, thereby lowering the consumption of electricity during the ignition process and reducing the pressure drop over the catalytic reactor during operation. The latter fact implies that the electricity consumption in the blower supplying the combustion chamber with air is reduced.

Another effect, resulting from the first catalytic reactor being of a considerably smaller size than in previously known catalytic combustion chambers, is that the total flow through the catalytic reactor is low during start-up. In this manner, the amount of carbohydrates and carbon monoxide which is emitted during the start-up process is minimal.

The reduced emission of uncombusted fuel is also due to the ignition process being optimized by control of the $\lambda$-value during the various ignition steps. In particular, the emission of carbohydrates and carbon monoxide is reduced.

The ratio between the amount of air and fuel being supplied to the catalytic combustion chamber is specified as the so called $\lambda$-value. The $\lambda$-value is a measure of the relative air/fuel ratio and constitutes the ratio between the real air/fuel ratio and the stoichiometric air/fuel ratio.

Low $\lambda$-values mean a "rich" fuel mixture with a large proportion of fuel in relation to the amount of air, while a high $\lambda$-value means a "lean" air/fuel mixture with relatively much air in the mixture.

In connection with motor vehicles, for instance cars, it has been increasingly more common to provide these vehicles with a car heater and/or an engine pre-heater. By using car heaters and engine pre-heaters, several advantages are achieved. One advantage is, of course, that it is possible to increase the comfort of the user of the vehicle by preheating the air in the vehicle to a pleasant temperature.

Another advantage is that pre-heating of the engine in a motor vehicle reduces the initial fuel consumption as well as the emission of incompletely combusted fuel during the start-up process.

In addition, the exhaust gases from the heater may be conducted into the inlet side of the engine, resulting in an easier and cleaner cold start of the engine at low temperatures. At a high $\lambda$-value, a large quantity of oxygen gas remains in the exhaust gas from the car heater, permitting the inlet air to contain a large proportion of heater exhaust gas.

A catalytic combustion chamber in accordance with the present invention is eminently suited for use in engine pre-heaters and heaters for motor vehicles. The low power consumption, the clean start and silent operation, as well as operational reliability, controllability and explosion safety are some of the advantages which carry particular weight.

Furthermore, it is possible to use a combustion chamber in accordance with the present invention for power and heat production for several other purposes. It may, for instance, be used in Sterling engines and gas turbines or for heating buildings. In the latter case, it is possible to use the flow of exhaust gas from the combustion chamber for direct heating, due to the fact that the emissions of carbohydrates, carbon dioxide and nitrogen oxides are very low, both during ignition of the combustion chamber and during operation. A particular advantage is thereby obtained when using a combustion chamber in accordance with the present invention for heating greenhouses, since the carbon monoxide which is produced during combustion may be used instead of the carbon dioxide which has to be supplied separately to the greenhouse air when using conventional heating.

The combustion chamber in accordance with the present invention has very good controllability. By adjusting the $\lambda$-value, the temperature can be controlled. By lowering the $\lambda$-value, the temperature is raised while a raised $\lambda$-value gives a lower temperature. In a corresponding manner, the power in a catalytic reactor may be controlled by changing the temperature at a constant mass flow through the catalytic reactor. This is achieved by injecting more fuel at the same air flow, whereby the $\lambda$-value is lowered and the temperature is raised.

During ignition, the $\lambda$-control is used to increase the temperature of the catalytic reactor, and thus the speed of heating the reactor. In this manner, a very clean startup process is obtained with negligible emission of nitrogen oxides, carbohydrates and carbon monoxide.

The high degree of controllability also lowers the total emission of carbohydrates and carbon monoxide during operation, since the broad controllable range means that shutdown and restart at low power can be avoided.

Since only either the air flow or the fuel injection needs to be altered in order to achieve a temperature change over a fairly broad range it is comparatively simple to control and adjust the temperature in the catalytic reactors. Conventional flame combustion chambers are extremely limited in their controllability, since the flame goes out when using lean fuel mixtures. In contrast, a combustion chamber in accordance with the present invention exhibits high operational reliability, since it is less susceptible to unwanted variations in the λ-value during operation.

BRIEF DESCRIPTION OF THE DRAWINGS

The present invention will in the following detailed description be described in detail with reference to the FIGS. which are shown in the appended drawings, wherein.

DETAILED DESCRIPTION

Figure 1:
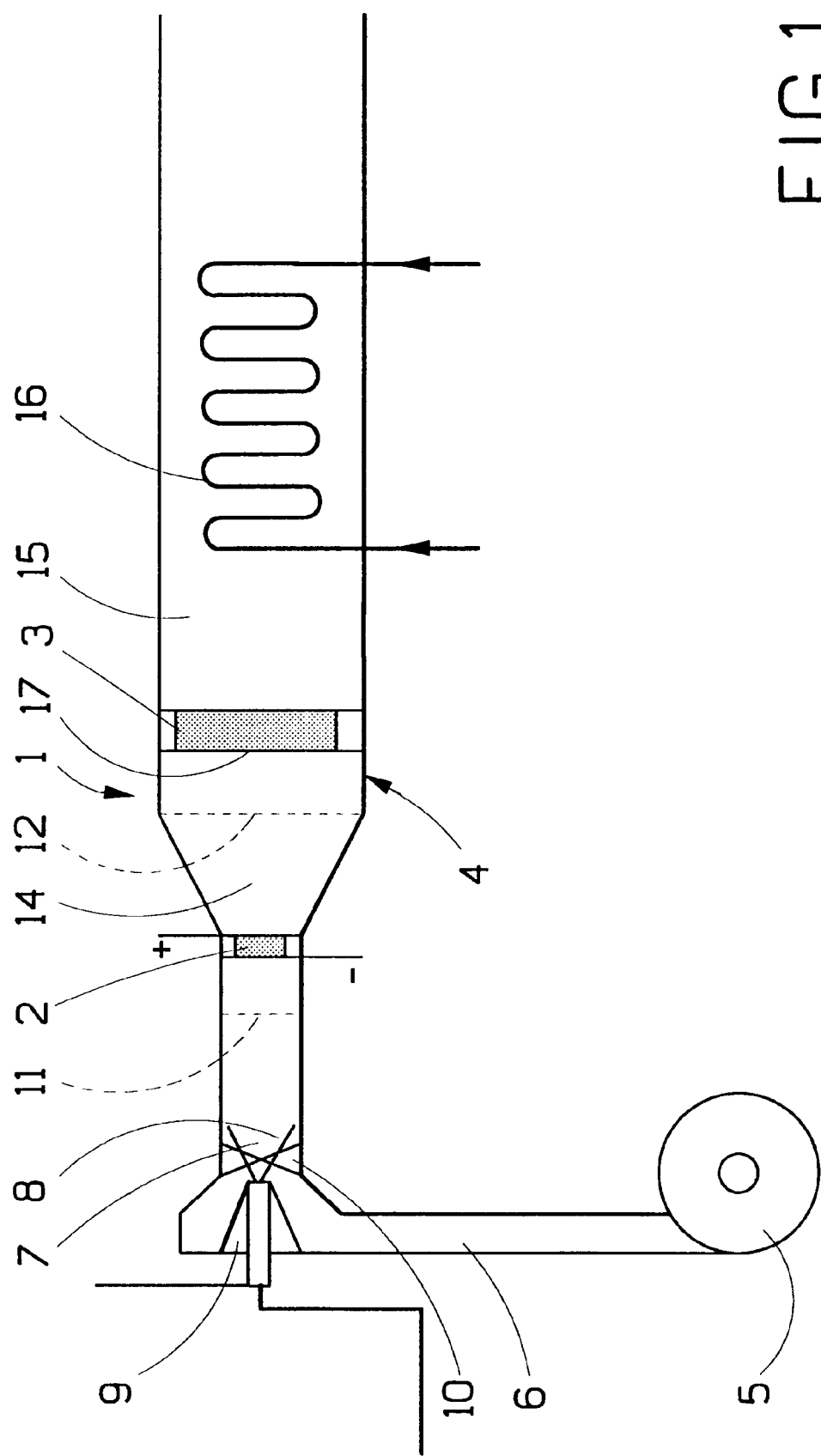
FIG. 1 is a side, elevational, schematic representation of a two-step catalytic combustion chamber in accordance with the present invention.

The combustion chamber I which is shown in FIG. 1 comprises a first catalytic reactor 2, the catalytic ignition reactor, and a second catalytic reactor 3, the main catalytic reactor. The two catalytic reactors, 2 and 3, are mounted in series inside a pipe-shaped casing 4.

Both catalytic reactors, 2 and 3, are so-called monoliths which implies that each catalytic reactor, 2 and 3, consists of a single, continuous carrier material having a catalyst arranged on the surface. Usually, a monolith has the shape of a hollow, elongated body with a plurality of penetrating channels extending in the longitudinal direction of the body. An advantage associated with a monolithic catalytic reactor is that the pressure drop over the catalytic reactor is very small. This is a significant difference over other types of catalytic reactors such as, for example, pellet beds.

The combustion chamber 1 is supplied with a mixture of air and fuel. The air is conducted from an air blower 5 by way of an air duct 6 to the inlet 7 of the combustion chamber. In the inlet 7 the air is mixed with atomized fuel 8 which is injected from a fuel injector 9. In order to accomplish an even mixture, a static mixer 10 is located in the inlet 7 to the catalytic combustion chamber 1. In addition, a first flow-equalizing and mixing net 11 is located upstream of the static mixer 10, and between the mixer and the catalytic ignition reactor 2, in order to achieve further homogenization of an air/fuel flow through the combustion chamber 1 as well as small scale turbulence which results in better mixing, and thus favorable combustion in the catalytic reactor.

In order to achieve good mixing in the static mixer 10, it is preferable if the mixer 10 has the shape of a propeller wherein the angle of the blades in relation to an axial center line through the combustion chamber 1 is greater at the central part of the mixer 10 than at its periphery. Accordingly, some examples of angles which may be used are a first angle of about 40° at the central part of the mixer 10 and a second angle of about 25° at the peripheral part of the mixer.

A suitable design of the flow equalizing net 11, giving the desired micro turbulence and, flow equalization in a fuel mixture after passage through the net, is a net wherein the ratio between the diameter of a net mesh and the diameter of a filament in the net, $D_{mesh}:D_{filament}$=from about 3 to 4.6.

The mixing devices which have been described are, of course, only intended as examples of mixing devices which can provide satisfactory mixing of the air/fuel flow. Consequently, other types of mixers which provide these desired results may be used.

A second flow equalizing net 12 is mounted between the catalytic ignition reactor 2 and the main catalytic reactor 3 in order to create an even flow profile downstream of the catalytic ignition reactor 2. The second flow equalizing net 12 is arranged in a cone-shaped intermediate chamber 14 which is limited by the two catalytic reactors, 2 and 3, and the surrounding combustion chamber casing 4.

The outlet 15 of the main catalytic reactor 3 is connected to a heat exchanger 16 in which the thermal energy from the flow of exhaust gas from the combustion chamber 1 is absorbed.

An alternative way of extracting the heat which is generated in the reaction in the main catalytic reactor 3 is to provide the carrier material of the main catalytic reactor 3 in the shape of a heat exchanger. In this manner, no separate heat exchanger 16 needs to be mounted after the main catalytic reactor.

The length of the catalytic ignition reactor 2 in the direction of the mass flow, and expressed as a part of the diameter D of the catalytic reactor, is suitably between about 1/2×D and 1/90×D and preferably between about 2/15×D and 2/45×D.

The relation between the volume of the catalytic ignition reactor 2 and the volume of the main catalytic reactor 3 is suitably from about $4.5 \times 10^{-3}$ to 0.18, and preferably from about 0.016 to 0.05. Instead of conventional monolithic catalytic reactors it is possible to use catalytic reactors in the shape of a net. In particular, the catalytic ignition reactor 2 may be a net with the advantage of requiring little space in construction. When catalytic reactors in the form of a net are used, it is, however, not meaningful to specify the ratio between the volume of the smaller catalytic reactor and that of the larger catalytic reactor.

In order to achieve efficient heating of the end surface 17 of the main catalytic reactor 3 which is closest to the catalytic ignition reactor 2, it has been found to be suitable to arrange the main catalytic reactor 3 at a distance x mm from the catalytic ignition reactor 2, where:

$$D_2 x/D_{-3} = 27-72.$$

where $D_2$=is the cross-sectional diameter of the catalytic ignition reactor and $D_3$=is the cross-sectional diameter of the main catalytic reactor.

The distance between the catalytic reactors is chosen so that rapid and even heating of the main catalytic reactor 3 is obtained, as well as an even flow profile during operation.

During ignition of the combustion chamber, a voltage is applied to the catalytic ignition reactor 2 from an energy source which is not shown in the drawings, whereby the resistance in the material causes the catalytic ignition reactor 2 to be heated to a temperature exceeding the ignition temperature of the catalytic ignition reactor 2. The temperature of a catalytic reactor may be determined by measuring the resistance in the catalytic reactor which is temperature-dependent. The resistance can be measured by using the heating current, or some other current which is applied. Alternatively, an ordinary temperature gauge may be used.

A mixture of air and fuel 8 is led through the static mixer 10 and the first flow equalizing net 11, and thereafter passes through the catalytic ignition reactor 2. The mixture 8 of air and fuel is obtained by atomizing fuel, such as gasoline or diesel fuel, in an injection valve at a differential pressure of approximately 3 bar, and injecting the atomized fuel from the injector 9 and mixing it with air from the air blower 5. When the fuel mixture 8 reaches the heated catalytic ignition reactor 2, combustion is initiated in the catalytic ignition reactor 2. Due to the combustion process, the temperature in the catalytic ignition reactor 2 is subsequently increased by increasing the amount of air in the air/fuel mixture 8. In this manner, 100% of the combustion now takes place in the catalytic ignition reactor 2.

Thereafter, the mass flow is increased further at a constant λ-value. The increased mass flow means that combustion no longer takes place only in the catalytic ignition reactor 2, but that part of the fuel is now combusted in the gas phase in the intermediate chamber 14 between the catalytic ignition reactor 2 and the main catalytic reactor 3. Preferably, the greater part of the combustion takes place in the gas phase in the intermediate chamber 14, the remaining combustion still being effectuated in the catalytic ignition reactor 2.

Through the gas phase combustion a flame is produced downstream of the catalytic ignition reactor 2. The flame rapidly heats the end surface 17 of the main catalytic reactor which is closest to the flame to the ignition temperature of the main catalytic reactor 3. In order to secure an even heating of all of the end surface 17 of the main catalytic reactor 3, as well as an even flow profile during operation, the second flow equalizing net 12 is, as has been previously mentioned, arranged between the two catalytic reactors, 2 and 3. When the surface temperature of the main catalytic reactor 3 exceeds or is equal to the ignition temperature of the catalytic reactor 3, the mass flow is increased once again by increasing the amount of air in the air/fuel-mixtures, whereafter the mass flow is further increased. Due to the increased mass flow, the combustion process is gradually transferred from the catalytic ignition reactor 2 and the gas phase to the main catalytic reactor 3 and the combustion in the combustion chamber 1 changes from a start-up state to an operational state.

The exhaust gases which are produced by Combustion in the main catalytic reactor 3 are led through the heat exchanger 16, whereby the heat content of the exhaust gases can be used for heating purposes, such as in an engine heater or a vehicle heater in a motor vehicle.

Figure 2:
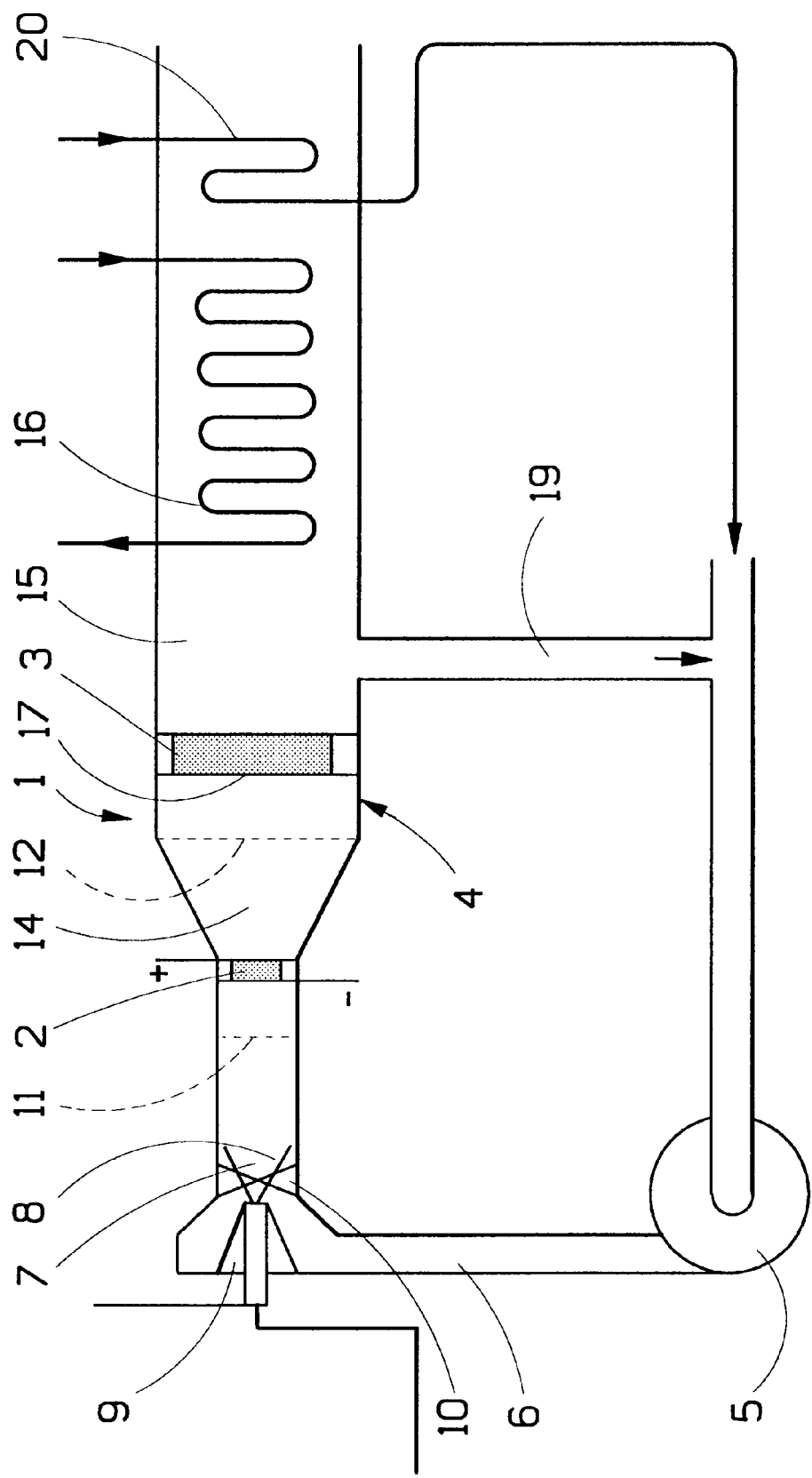
FIG. 2 is a side, elevational, schematic representation of the catalytic combustion chamber of FIG. 1, with two variants of recycling of heat from the exhaust gases from the combustion chamber.

In order to increase the efficiency of the system, a small portion of the warm exhaust gases from the main catalytic reactor 3 may be recirculated through a conduit 19 between the space after the second catalytic reactor 3 and the air blower 5, as shown in FIG. 2. The recirculated flow of exhaust gas may thus be used to achieve fuel vaporization. Furthermore, in FIG. 2 there is shown an alternative way of vaporizing the fuel and increasing the efficiency of the system by conducting the air to the air blower 5 through a second heat exchanger 20 which is mounted downstream of the previously described-first heat exchanger 16. In this manner, the residual heat in the exhaust gas may be utilized for heating the air to the blower 5. The two systems which are shown in FIG. 2 do not have to be combined, but may be used separately. In addition, it is possible to pre-heat the fuel to the combustion chamber. Such pre-heating may be performed during the start-up process by using electricity or by using combustion heat. During operation, combustion heat is preferably used.

Moreover, the combustion chamber 1 may be used to produce electrical energy by arranging a so called Peltier element on the surf ace of the main catalytic reactor 3 or on the heat exchanger 16. A Peltier element builds on the principle of creating a voltage differential between two metal surfaces having mutually different temperatures. By arranging one metal surface of the Peltier element on the outer surface of the catalytic reactor, it is possible to convert part of the thermal energy which is produced in the catalytic reactor into electrical energy. In this manner, the combustion chamber is made self supporting and may be used as a support charger for connected systems.

In order to further illustrate the present invention, an ignition sequence for ignition of a combustion chamber in accordance with the present invention will be described in the following example.

EXAMPLE

A catalytic combustion chamber of the type shown in FIG. 1 was used. Both catalytic reactors, 2 and 3, were precious metal based monolithic catalytic reactors, i.e. catalytic reactors having a catalyst surface of platinum, palladium, or rhodium. The ratio between the volume of the catalytic ignition reactor 2 and the volume of the main catalytic reactor 3 was 0.041. The cell density of the catalytic reactors was 400 cells/sq. inch calculated over the cross-sectional area of each catalytic reactor. The ignition temperature of the catalytic reactors, 2 and 3, was approximately 200° C. The ignition temperature of a catalytic reactor is defined as the temperature at which a conversion rate of 50% is achieved.

The catalytic ignition reactor 2 is electrically heated to 4000 C. Thereafter, a mixture of fuel/air having a λ-value of 1.5 is introduced. At a surface temperature of the catalytic ignition reactor 2 of 900° C., λ is increased to 2.5 by increasing the air mass flow. All combustion thereby takes place in the catalytic ignition reactor 2. Thereafter the mass flow is further increased at a λ-value of 2.5, whereby a part of the combustion is transferred from the catalytic ignition reactor 2 and now takes place in the gas phase in a flame which is produced in the intermediate chamber 14 between the catalytic ignition reactor 2 and the main catalytic reactor 3. When the surface temperature of the closest end surface 17 of the main catalytic reactor 3 reaches 400° C., the mass flow is further increased whereby all combustion is gradually transferred from the catalytic ignition reactor 2 and the flame in the intermediary chamber 14 to the main catalytic reactor 3. In this manner, the λ-value is 2.8. Stable and even operational combustion has now been reached.

The ignition temperatures and operational temperatures which have been given are chosen considering the catalytic reactors and the fuel which was used. However, the temperature depends only to a comparatively limited extent on the type of fuel which is being used. Accordingly, when gasoline was used the temperature in the material of the catalytic reactors was approximately 1000° C., while the gas phase temperature was approximately 950° C.

The combustion chamber will work even if the temperature is somewhat lower, or higher. The optimal temperatures are determined by weighing the speed of the ignition process against the power consumption during ignition. A higher pre-heating temperature, for instance 800° C., has the further advantage that the start-up process is somewhat cleaner than at 400° C. However, since the start-up process only produces insignificant amounts of emissions, the increase in cleanliness which may be achieved at a higher pre-heating temperature is of no consequence for most applications. A lower pre-heating temperature has the advantage of lower energy consumption during the start-up process.

When using catalytic reactors other than the combination which has been described herein, the temperatures which are suitable for ignition and operation may, of course, be different from those which have been given herein.

As is evident from the above example, a high reaction rate is obtained within the ignition temperature range due to a low λ-value. As may be deduced from Diagram 1, the reaction rate is strongly dependent on temperature within this region, wherein a low λ-value results in a high reaction rate. In the region wherein the mass transport is limiting, the reaction rate is less dependent on temperature and is, instead, strongly dependent on mass flow. In this region the effect generation is increased by increasing the λ-value.

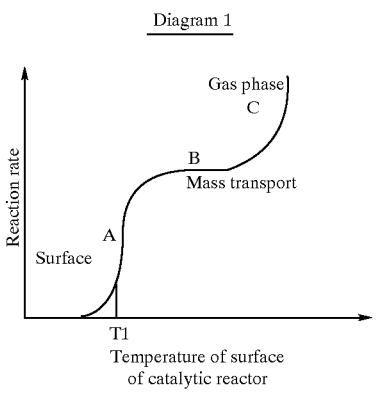

Diagram 1

At low temperatures, corresponding to the region A in Diagram 1, combustion is initiated on the surface of the catalytic reactor. The reaction takes place only at the surface of the catalytic reactor and the temperature is close to the temperature in the reaction mixture. Within this region, the reaction rate is kinetically controlled. When the temperature reaches T1, corresponding to the ignition temperature of the catalytic reactor, the temperature is rapidly raised until the combustion reaches the mass transport limited region, marked B in the Diagram.

Due to the mass transfer limitation, the reaction rate within this region is only marginally dependent on the temperature. The concentration of fuel is very low near by the surface of the catalytic reactor and the temperature of the catalytic reactor is higher than the temperature of the mass flow through the catalytic reactor. At even higher temperatures, within region C in the Diagram, gas phase combustion is predominant and the reaction rate is exponentially increased.

The present invention shall not be considered to be limited to the herein described example, but a plurality of further modifications and variants are conceivable within the scope of the appended claims.

It is, for instance, possible to use an ignition process wherein several serially arranged catalytic reactors are used to ignite a main catalytic reactor in a multi-step process.

Moreover, it is not necessary for the present invention that the catalytic ignition reactor is electrically heated, and instead conventional flame heating may be used.

In order to increase the power in the main catalytic reactor, it is possible to control the mass flow and the λ-value so that gas phase combustion is also obtained downstream of the main catalytic reactor. This is a way to extract greater power from a catalytic reactor of a certain, predetermined size.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of operating a catalytic combustion chamber including a first catalytic reactor, a second catalytic reactor including an end surface facing said first catalytic reactor, said second catalytic reactor disposed in series with said first catalytic reactor, and an intermediate chamber between said first and second catalytic reactors, said method comprising heating the first catalytic reactor to a temperature at least equal to the ignition temperature of said first catalytic reactor, introducing an air and fuel mixture to said first catalytic reactor, whereby catalytic combustion is initiated in said first catalytic reactor, and increasing the mass flow of at least said air through said first catalytic reactor whereby combustion of said air and fuel mixture takes place in the gas phase in said intermediate chamber and said end surface is heated to a temperature at least equal to the ignition temperature of said second catalytic reactor and ignition takes place in said second catalytic reactor.

2. The method of claim 1 including adjusting said mass flow through said second catalytic reactor after said ignition in said second catalytic reactor whereby substantially all of said combustion takes place in said second catalytic reactor.

3. The method of claim 2 including adjusting said mass flow through said second catalytic reactor after substantially all of said end surface of said second catalytic reactor is heated to a temperature at least equal to said ignition temperature of said second catalytic reactor.

4. The method of claim 1 including preheating said first catalytic reactor to said ignition temperature of said first catalytic reactor prior to said introducing of said air and fuel mixture to said first catalytic reactor, said air and fuel mixture having a λ value of greater than about 1, whereby said combustion is initiated in said first catalytic reactor and the temperature of said first catalytic reactor is raised above said ignition temperature of said first catalytic reactor, increasing the mass flow of said air through said first catalytic reactor at a temperature corresponding to from between about 60% and 100% conversion in said first catalytic reactor and said λ value is increased, and further increasing said mass flow of said air through said first catalytic reactor at a substantially constant λ value whereby at least part of said combustion takes place in the gas phase in said intermediate chamber.

5. The method of claim 1 including electrically preheating said first catalytic reactor.

6. The method of claim 1 wherein substantially all of said combustion upstream of said second catalytic reactor takes place in said gas phase in said intermediate chamber during said ignition in said second catalytic reactor.

* * * * *

UNITED STATES PATENT AND TRADEMARK OFFICE
CERTIFICATE OF CORRECTION

PATENT NO.     : 6,302,683 B1
DATED          : October 16, 2001
INVENTOR(S)    : Vestin et al.

It is certified that error appears in the above-identified patent and that said Letters Patent is hereby corrected as shown below:

Column 1,
Line 13, change "And" to -- and --.

Column 5,
Line 33, change "by.increasing" to -- by increasing --.

Column 7,
Line 30, change "I" to -- 1 --.

Column 9,
Line 44, change "Combustion" to -- combustion --.

Column 10,
Line 3, change "surf ace" to -- surface --.
Line 33, change "4000 C" to -- 400°C --.

Column 11,
Line 46, change "near by" to -- nearby --.

Signed and Sealed this

Twenty-sixth Day of March, 2002

Attest:

*Attesting Officer*

JAMES E. ROGAN
*Director of the United States Patent and Trademark Office*